(12) United States Patent
Wang

(10) Patent No.: US 8,562,729 B2
(45) Date of Patent: Oct. 22, 2013

(54) HIGHLIGHTING INK FORMULATION COMPRISING AN ANTI-SMEAR AGENT

(75) Inventor: Xiaomang Wang, Lake Bluff, IL (US)

(73) Assignee: Sanford, L.P., Oak Brook, IL (US)

( * ) Notice: Subject to any disclaimer, the term of this patent is extended or adjusted under 35 U.S.C. 154(b) by 307 days.

(21) Appl. No.: 12/887,440

(22) Filed: Sep. 21, 2010

(65) Prior Publication Data

US 2012/0070584 A1     Mar. 22, 2012

(51) Int. Cl.
    *C09D 11/16*   (2006.01)
(52) U.S. Cl.
    USPC .................................... 106/31.32; 106/31.64
(58) Field of Classification Search
    USPC .......................................... 106/31.32, 31.64
    See application file for complete search history.

(56) References Cited

U.S. PATENT DOCUMENTS

| | | | |
|---|---|---|---|
| 6,054,505 A | 4/2000 | Gundlach et al. | |
| 6,258,873 B1 | 7/2001 | Gundlach et al. | |
| 6,524,382 B1 | 2/2003 | Bujard et al. | |
| 7,364,614 B2 | 4/2008 | Kwan et al. | |
| 7,365,107 B2 | 4/2008 | Denninger et al. | |
| 7,604,694 B2 | 10/2009 | Denninger et al. | |
| 2002/0005884 A1* | 1/2002 | Onishi et al. | 347/100 |
| 2003/0226474 A1* | 12/2003 | Mammen et al. | 106/31.15 |
| 2005/0093949 A1* | 5/2005 | Schmid et al. | 347/100 |

FOREIGN PATENT DOCUMENTS

| | | |
|---|---|---|
| DE | 101 03 982 A1 | 8/2002 |
| GB | 1 541 600 A | 3/1979 |

OTHER PUBLICATIONS

International Search Report for International Application No. PCT/US2011/051680, dated Dec. 6, 2011.
Written Opinion for International Application No. PCT/US2011/051680, dated Dec. 6, 2011.

* cited by examiner

*Primary Examiner* — Kaj K Olsen
*Assistant Examiner* — Veronica F Faison
(74) *Attorney, Agent, or Firm* — Marshall, Gerstein & Borun LLP

(57) ABSTRACT

The disclosure is generally related to highlighting ink formulations and writing instruments containing the same. The disclosure provides a highlighting ink formulation that includes a solvent system, a colorant dispersed or dissolved in the solvent system, and an anti-smear agent dispersed or dissolved in the solvent system, wherein the anti-smear agent includes a monovalent cation and/or a divalent cation.

16 Claims, 3 Drawing Sheets

HIGHLIGHTING INK FORMULATION COMPRISING AN ANTI-SMEAR AGENT

BACKGROUND

1. Field of the Invention

The disclosure is generally related to highlighting ink formulations and writing instruments containing the same. More particularly, the disclosure is related to highlighting ink formulations having at least one anti-smear agent.

2. Brief Description of Related Technology

Highlighting a previously applied marking is typically performed by applying a highlighting ink over the previously applied marking. Typically, the highlighting ink has a translucent quality to allow for a user to apply the highlighting ink and yet still see the previously applied marking under the fluorescent highlighting ink marking. Prior art highlighting ink formulations, however, can undesirably smear, smudge, or blur, the previously applied marking, thereby causing the underlying text to become unsightly and/or difficult to read.

SUMMARY OF THE INVENTION

The highlighting ink formulations of the disclosure have one or more advantages, such as, for example, causing substantially no smearing of a previously applied marking when applied thereover (at least when compared to known highlighting ink formulations). Thus, advantageously, the highlighting ink formulations of the disclosure can attract attention to selected previously applied markings without substantially smearing, smudging, or otherwise blurring the previously applied marking (at least when compared to known highlighting ink formulations).

In a first embodiment, the disclosure provides a highlighting ink formulation having a solvent system, a colorant dispersed or dissolved in the solvent system, and an anti-smear agent dispersed or dissolved in the solvent system, wherein the anti-smear agent comprises at least one monovalent cation.

In a second embodiment, the disclosure provides a highlighting ink formulation comprising a solvent system, a colorant dispersed or dissolved in the solvent system, and an anti-smear agent dispersed or dissolved in the solvent system, the anti-smear agent comprising a salt of a monovalent cation, wherein the anti-smear agent is included in an amount in a range of about 5 wt. % to about 40 wt. %.

In a third embodiment, the disclosure provides a highlighting ink formulation comprising a solvent system, a dye dissolved in the solvent system, and an anti-smear agent dispersed or dissolved in the solvent system, wherein the anti-smear agent comprises a cation selected from the group consisting of monovalent cations, divalent cations, and combinations thereof.

In a fourth embodiment, the disclosure provides a highlighting ink formulation comprising a solvent system, a dye dissolved in the solvent system, and an anti-smear agent dispersed or dissolved in the solvent system, the anti-smear agent comprising a lithium cation.

In another embodiment, the disclosure provides a writing instrument, such as, for example, a pen or a marker, containing a highlighting ink formulation according to any one of the above-described first, second, third, and fourth embodiments.

In yet another embodiment, the disclosure provides a method of highlighting a previously applied marking, the method comprising applying a highlighting ink formulation according to any one of the above-described first, second, third, and fourth embodiments of the disclosure over the previously applied marking, without substantially smearing, smudging, or otherwise blurring the previously applied marking (at least when compared to known highlighting ink formulations).

DETAILED DESCRIPTION OF THE INVENTION

The highlighting ink formulations of the disclosure have one or more advantages, such as, for example, causing substantially no smearing of a previously applied marking when applied thereover (at least when compared to known highlighting ink formulations). Thus, the highlighting ink formulations of the disclosure can be applied over a previously applied marking without substantially smearing, smudging, or blurring the marking (at least when compared to known highlighting ink formulations). Advantageously, the highlighting ink formulations of the disclosure can better attract attention to a selected previously applied marking because a user's visual perception (of the now highlighted marking) is substantially unaffected by smearing, smudging, or blurring of the previously applied marking (at least when compared to known highlighting ink formulations). In each of the embodiments disclosed herein, the highlighting ink formulations can be incorporated into a writing instrument, such as a pen or marker.

The highlighting ink formulations of the disclosure include at least one anti-smear agent and a colorant dispersed or dissolved in a solvent system. The anti-smear agent can include monovalent cations, divalent cations, or mixtures thereof. In one aspect of the disclosure, the ink formulation comprises an anti-smear agent including a monovalent cation or a combination of monovalent cations. In another aspect of the disclosure, the ink formulation comprises an anti-smear agent having a divalent cation or a combination of divalent cations. In yet another aspect of the disclosure, the ink formulation comprises an anti-smear agent including a combination of one or more monovalent cations and one or more divalent cations.

Figure 1A:
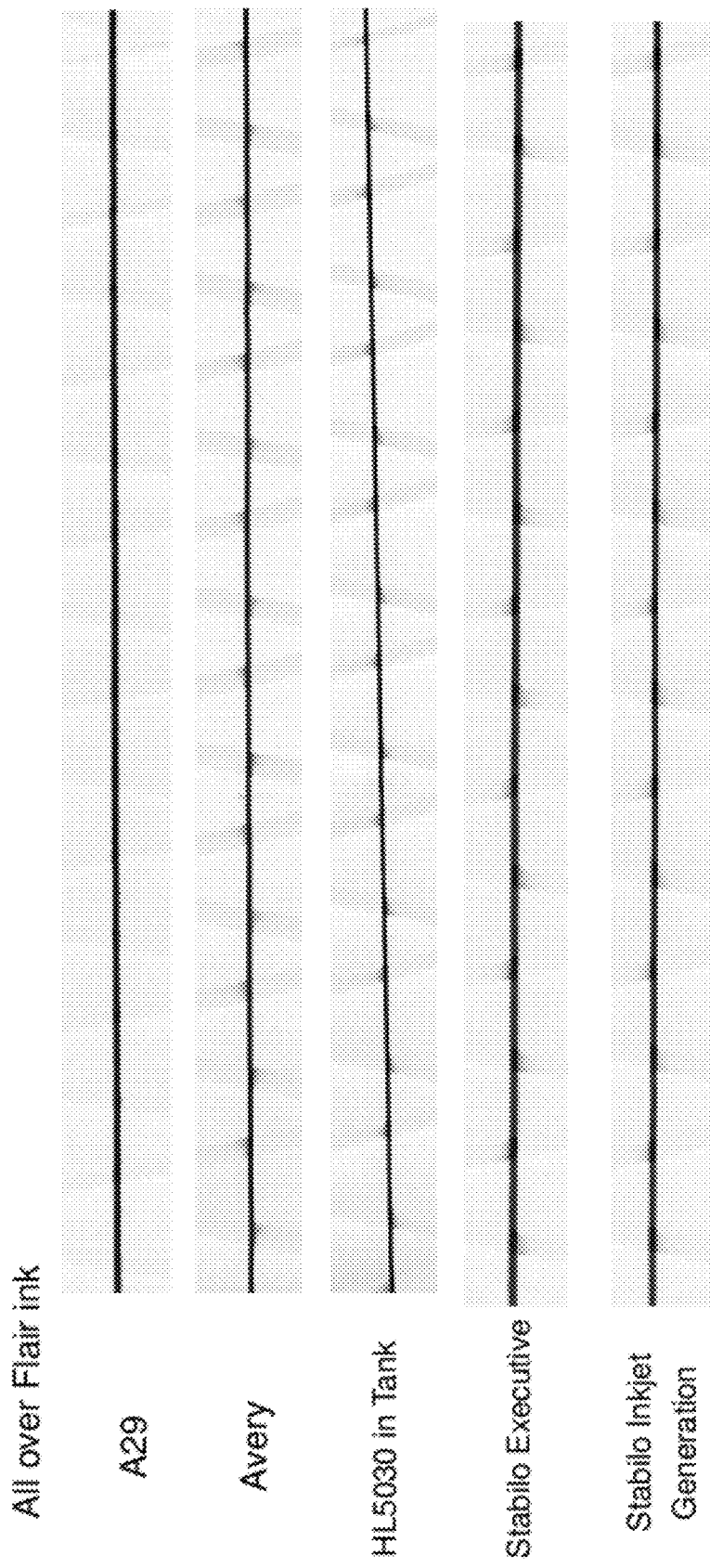
FIG. 1A is an image showing a comparison of the smears produced by an ink formulation in accordance with the disclosure and commercially available ink formulations when the respective formulations are used to highlight a previously applied ink marking.
Figure 1B:
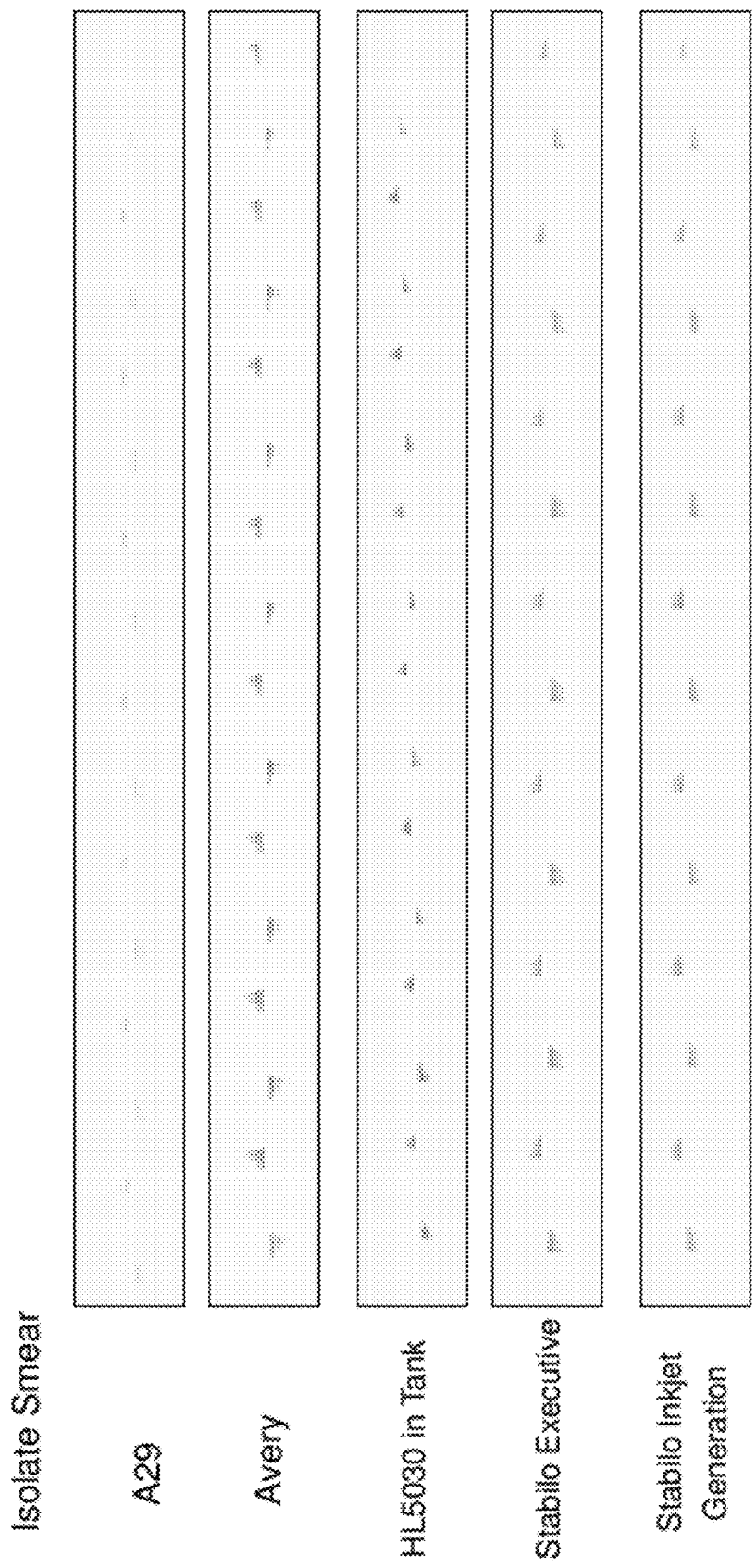
FIG. 1B is an image showing the isolated smears of the smear comparison of FIG. 1A.
Figure 1C:
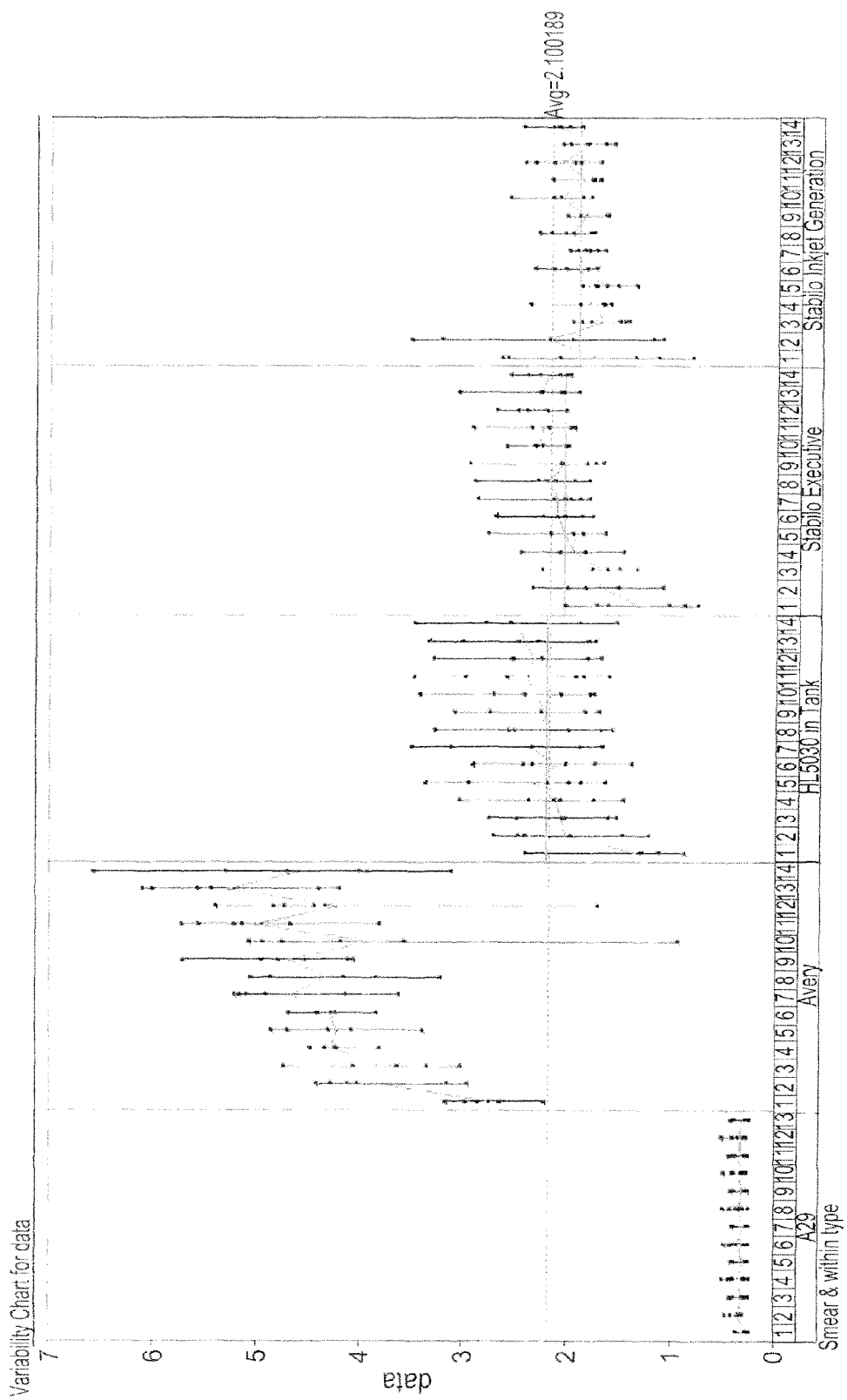
FIG. 1C is a graph of the data showing the area of the smears of the smear comparison of FIG. 1A.

Referring to FIGS. 1A-1C, a previously written or applied marking can be highlighted using the ink formulations in accordance with the disclosure by applying the ink formulation over the previously applied marking. As shown in FIGS. 1A-1C, the highlighting ink formulations according to the disclosure cause little to no smearing, smudging, or blurring of the previously applied marking (particularly when compared to known highlighting ink formulations). For example, the smear created by the ink formulations of the disclosure can have an area of less than about 1 $mm^2$, less than about 0.9 $mm^2$, less than about 0.8 $mm^2$, less than about 0.7 $mm^2$, less than about 0.6 $mm^2$, less than about 0.5 $mm^2$, less than about 0.4, $mm^2$, less than about 0.3 $mm^2$, less than about 0.2 $mm^2$, or less than about 0.1 $mm^2$. For example, an ink formulation of the disclosure including lithium chloride as an anti-smear agent can generate a smear of less than about 0.3 $mm^2$. As shown in FIGS. 1A-1C and in the data of the table in Example 21 below, commercially available highlighting ink formulations create significantly larger smears, with an average smear area of about 2.6 mm².

Anti-Smear Agent

The anti-smear agent included in the ink formulation comprises a cation selected from the group consisting of monovalent cations, divalent cations, and combinations thereof. For example, the anti-smear agent can include one or more monovalent cations, one or more divalent cations, or a combination of monovalent and divalent cations. Examples of suitable monovalent cations include sodium, lithium, potassium, copper (I), silver (I), gold (I), and combinations thereof Examples of suitable divalent cations include magnesium, calcium, copper (II), zinc, iron (II), tin (II), and combinations thereof. The monovalent or divalent cation can be provided, for example, in the form of a salt. The anion used as the opposed ion can be, for example, chloride, nitride, sulfate, acetate, citrate, propionate, borate, and phosphate. Examples of suitable salts of monovalent cations include, but are not limited to, lithium chloride, lithium acetate, lithium carbonate, lithium borate, lithium nitrate, lithium phosphate, sodium chloride, sodium acetate, sodium carbonate, sodium borate, sodium nitrate, sodium phosphate, potassium acetate, potassium chloride, potassium carbonate, potassium borate, potassium phosphate, potassium nitrate, copper (I) chloride, copper (I) nitride, copper (I) sulfate, copper (I) acetate, copper (I) citrate, copper (I) propionate, copper (I) borate, copper (I) phosphate, silver (I) chloride, silver (I) nitride, silver (I) sulfate, silver (I) acetate, silver (I) citrate, silver (I) propionate, silver (I) borate, silver (I) phosphate, gold (I) chloride, gold (I) nitride, gold (I) sulfate, gold (I) acetate, gold (I) citrate, gold (I) propionate, gold (I) borate, and gold (I) phosphate. Examples of suitable salts of divalent cations include, but are not limited to, magnesium chloride, magnesium acetate, magnesium carbonate, magnesium borate, magnesium nitrate, magnesium phosphate, calcium chloride, calcium acetate, calcium carbonate, calcium borate, calcium nitrate, calcium nitrate, calcium phosphate, zinc chloride, zinc acetate, zinc carbonate, zinc nitrate, zinc phosphate, copper (II) chloride, copper (II) acetate, copper (II) carbonate, copper (II) nitrate, copper (II) phosphate, tin (II) chloride, tin (II) acetate, tin (II) carbonate, tin (II) nitrate, tin (II) phosphate, ferrous chloride, ferrous acetate, ferrous carbonate, ferrous nitrate, ferrous phosphate, and combinations thereof. The anti-smear agent can include a combination of compounds having monovalent and/or divalent cations. For example, the anti-smear agent can include lithium and sodium, for example, in the form of lithium chloride and sodium acetate. Other combination of monovalent and/or divalent cations can also be included to provide the anti-smear agent.

The anti-smear agent, whether provided as a compounds having one or more monovalent cations, one or more divalent cations, or a combination of monvalent and divalent cations, can be included in the ink formulation in a range of about 1 weight percent (wt. %) to about 40 wt. %, about 5 wt. % to about 40 wt. %, about 5 wt. % to about 30 wt. %, about 10 wt. % to about 25 wt. %, or about 15 wt. % to about 20 wt. % based on the total weight of the ink formulation. Specific amounts of the anti-smear agent include, for example, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 wt. % based on the total weight of the ink formulation. In general, the anti-smear agent can be included up to the solubility limit of the anti-smear agent in the ink formulation.

Inclusion of greater than 10 wt. % of the anti-smear agent LiCl can dramatically increase the cap off time of the ink formulation. As used herein, "cap-off time" refers to the last time interval that a writing instrument including the ink formulation was capable of producing an unbroken continuous line. For example, inclusion of about 12 wt. % to about 30 wt. %, about 14 wt. % to about 25 wt. %, and/or about 15 wt. % to about 20 wt. % of the anti-smear agent LiC1 can dramatically increase the cap off time of the ink formulation. Other suitable amounts of the anti-smear agent for increasing the cap-off time include about 12, 13, 14, 15, 16, 17, 18, 19, 20, 21, 22, 23, 24, 25, 26, 27, 28, 29, or 30 wt. %. In one embodiment, a cap off time of greater than 90 hours can be achieved for an ink formulation containing about 15 wt. % LiCl. The aforementioned improvement in cap-off time achieved with about 15 wt. % LiCl entails a surprising and unexpected improvement.

As mentioned above, the anti-smear agent can include a combination of monovalent and/or divalent cations. For example, first and second anti-smear agents including first and second cations can be included in the ink formulation such that the total amount of anti-smear agent in the ink formulation is less than or equal to about 40 wt. % based on the total weight of the ink formulation.

Solvent System

The anti-smear agent can be dispersed or dissolved in a solvent system comprising one or more solvents. Typically, the anti-smear agent is dissolved in the solvent system. Although organic solvent systems may be used, the ink formulation is typically aqueous, and therefore, includes water (preferably deionized water) as the major component of the solvent system. Water can be included in the ink formulation in a range of about 10 wt. % to about 90 wt. %, about 20 wt. % to about 80 wt. %, about 30 wt. % to about 70 wt. %, about 40 wt. % to about 60 wt. %, and about 40 wt. % to about 90 wt. % based on the total weight of the ink formulation. Specific amounts of solvent systems can include about 10, 15, 20, 25, 30, 35, 40, 45, 50, 55, 60, 65, 70, 75, 80, 85, and 90 wt. % based on the total weight of the ink formulation.

The ink formulation solvent system can further include other co-solvents, for example, water soluble solvents. Examples of suitable co-solvents include glycerin, propylene glycol, ethylene glycol, diglycerine, triglycerine, diglycol, dipropylene glycol, butylene glycols, hexylene glycols, diethylene glycol, triethylene glycol, and combinations thereof. Other suitable glycols can include, for example, (a) glycol ethers, such as, for example, ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether, ethylene glycol dimethyl ether, ethylene glycol diethyl ether, diethylene glycol dimethyl ether, propylene glycol monomethyl ether; (b) glycol ether acetates such as, for example, ethylene glycol monomethyl ether acetate, ethylene glycol monoethyl ether acetate, ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate, propylene glycol monomethyl ether acetate, and the like; and (c) glycol acetates, such as, for example, ethylene glycol monoacetate, ethylene glycol diacetate, and diethylene glycol diacetate.

The co-solvent can be included in the ink formulation in a range of about 1 wt. % to about 40 wt. %, about 5 wt. % to about 30 wt. %, about 10 wt. % to about 20 wt. %, or about 5 wt. % to about 15 wt. % based on the total weight of the ink formulation. Specific amounts of the co-solvent include, for example, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40 wt. % based on the total weight of the ink formulation.

Colorant

The ink formulation can include a colorant. Preferably, when the ink formulation is used as a highlighting ink, the colorant is a fluorescent colorant. The colorant can be included in the ink formulation in a range of about 0.1 wt. % to about 30 wt. %, about 0.5 wt. % to about 25 wt. %, about 1 wt. % to about 20 wt. %, and about 5 wt. % to about 15 wt. % based on the total weight of the ink formulation. Specific suitable amounts of colorant include, for example, about 0.1, 0.5, 1, 5, 10, 15, 20, 25, and 30 wt. % based on the total weight of the ink formulation.

The colorant can be, for example, a dye. Suitable dyes include, but are not limited to, basic dyes, acid dyes, solvent dyes, fluorescent dyes, and direct dyes. Xanthene dyes, coumarin dyes, benzoxanthene dyes, naphthalimide dyes, benzothioxanthene dyes, and acridine dyes can be used. Examples of specific dyes include, but are not limited to, Pyranine conc. 1020, SPECTRAMINE® TURQUOISE G LIQUID (Spectra Colors Corp., N.J.), SPECTRA® EOSINE OJ conc. (Spectra Colors Corp.), SPECTRACID® URANINE crude (Spectra Colors Corp.), SPECTRA®RHODAMINE BIJ crude (Spectra Colors Corp.), Auramine O, Basic Yellow 2, Basic Yellow 11, Basic Yellow 13, Basic Yellow 21, Basic Yellow 28, Basic Yellow 29, Basic Yellow 40, Acid Blue 22, Acid Blue 93, Acid Blue 9 (available from Emerald Hilton Davis as HIDACID® Blue 9), Acid Fuchsin, Acid Green, Acid Green 5, Acid Magenta, Acid Roseine, Acid Rubin, Acid Violet 17, Acid Violet 19, Alizarol Cyanin R, Aluminon, Aniline Blue Ws, Basic Blue 8, Basic Blue 15, Basic Blue 20, Basic Blue 26, Basic Fuchsin, Basic Green 4, Basic Red 9, Basic Red 14, Basic Red 15, Basic Red 29, Basic Red 46, Basic Violet 2, Basic Violet 3, Basic Violet 4, Basic Violet 14, Solvent Green 7 (available from Emerald Hilton Davis as HIDACID®PYRANINE), Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta II, Magenta III, Malachite Green, Methyl Blue, Methyl Green, Methyl Violet, Methyl Violet 2b, Methyl Violet 10b, Mordant Blue 3, Mordant Violet 39, New Fuchsin, Night Blue, Pararosanilin, Primula, Rosanilin, Solochrome Cyanin R, Victoria Blue 4r, Victoria Blue B, Victoria Green B, Water Blue I, Food Red No. 40, Food Blue No. 1, Food Yellow No. 7, and the like; FD & C dyes; Direct Blue dyes (Nos. 1, 6, 8, 14, 15, 25, 71, 76, 78, 80, 86, 90, 106, 108, 123, 163, 165, 199, 226, and the like); Direct Red dyes (Nos. 1, 2, 16, 23, 24, 28, 39, 62, 72, 227, 236, and the like); Direct Yellow dyes (Nos. 4, 11, 12, 27, 28, 33, 34, 39, 50, 58, 86, 100, 106, 107, 110, 118, 127, 132, 142, 157, and the like); anthraquinone dyes; monoazo dyes; disazo dyes; phthalocyanine derivatives, including, for example, various phthalocyanine sulfonate salts; aza annulenes; formazan copper complexes; triphenodioxazines; BERNACID Red 2BMN; PONTAMINE® dyes such as PONTAMINE® Brilliant Bond Blue A; Cibacron Brilliant Red 38-A (i.e., Reactive Red 4) (Aldrich Chemical); Drimarene Brilliant Red X-2B (i.e., Reactive Red 56) (Pylam, Inc.); LEVAFIX® Brilliant Red E-4B (Mobay Chemical, Haledon, N.J.); LEVAFIX® Brilliant Red E-6BA (Mobay Chemical); PROCION® Red H8B (i.e., Reactive Red 31) (ICI America); Direct Brilliant Pink B Ground Crude, (Crompton & Knowles); CARTASOL®Yellow GTF Presscake (Sandoz, Inc.); CARTASOL® Yellow GTF Liquid Special 110 (Sandoz, Inc.); Yellow Shade 16948 (Tricon); BASACID® Black X34 (i.e., BASF X-34) (BASF); Carta Black 2GT (Sandoz, Inc.); NEOZAPON® Red 492 (BASF); ORASOL® Red G (Ciba-Geigy); Direct Brilliant Pink B (Crompton-Knowles); AIZEN SPILON Red C-BH (Hodogaya Chemical Company); KAYANOL Red 3BL (Nippon Kayaku Company); LEVANOL Brilliant Red 3BW (Mobay Chemical Company); LEVADERM® Lemon Yellow (Mobay Chemical Company); Spirit Fast Yellow 3G; AIZEN SPILON Yellow C-GNH (Hodogaya Chemical Company); SIRIUS Supra Yellow GD 167; CARTASOL® Brilliant Yellow 4GF (Sandoz, Inc.); PERGASOL® Yellow CGP (Ciba-Geigy); ORASOL® Black RL (Ciba-Geigy); ORASOL® Black RLP (Ciba-Geigy); SAVINYL® Black RLS (Sandoz); DERMACARBON 2GT (Sandoz); PYRAZOL® Black BG (ICI); MORFAST® Black Concentrate A (Morton-Thiokol); DIAZOL Black RN Quad (ICI); ORASOL® Blue GN (Ciba-Geigy); SAVINYL® Blue GLS (Sandoz, Inc.); LUXOL® Blue MBSN (Morton-Thiokol); SEVRON® Blue 5GMF (ICI); BASACID® Blue 750 (BASF); BERNACID Red (Berncolors, Poughkeepsie, N.Y.); BERNCOLOR A.Y. 34; TELON® Fast Yellow 4GL-175; BASF® BASACID® Black SE 0228; various Reactive dyes, including Reactive Black dyes, Reactive Blue dyes, Reactive Red dyes such as Reactive red 180 and the like, Reactive Yellow dyes including Reactive yellow 37 and the like; and mixtures thereof, and combinations thereof.

The dye can be included in the ink formulation in a range of about 0.1 wt. % to about 5 wt. %, about 0.5 wt. % to about 4.5 wt. % about 1 wt. % to about 4 wt. %, or about 2 wt. % to about 3 wt. % based on the total weight of the ink formulation. Specific amounts of the dye include, for example, about 0.1, 0.2, 0.3, 0.4, 0.5, 1, 1.5, 2, 2.5, 3, 3.5, 4, 4.5, and 5 wt. % based on the total weight of the ink formulation.

The colorant can comprise a pigment in addition to the dye. Alternatively, the colorant can comprise a pigment as an alternative to a dye. Pigments useful in the disclosed ink formulation are often included in the ink formulation in the form of pigment dispersions, in which a pigment is dispersed, dissolved, or otherwise distributed in a resin. The pigment dispersions can further include a surfactant. The pigment dispersions can also be formed, for example, by combining a solvent such as water with a resin and a pigment. The pigment dispersion resin can be, for example, an acrylic resin.

Generally, any pigment can be used as the colorant in the ink foimulations according to the disclosure. For example, organic pigments, inorganic pigments, and pigment precursors can be used as the colorant in the pigment dispersion. Representative pigments for use in the ink formulations of the disclosure include, but are not limited to, phthalocyanine pigments, quinacridone pigments, benzimidazolone pigments, beta-naphthol pigments, carbon black pigments. Specific pigments include, but are not limited to, titanium dioxide, zinc oxide, calcium carbonate, lead white (lead carbonate), barium sulfate, iron blue, cobalt blue, ultramarine blue, black iron oxide (Iron (II, III) oxide), logwood, brown iron oxide, cadmium red, red iron oxide, cadmium yellow (CdS, CdZnS), curcuma yellow, yellow iron oxide, green chromate oxide, malachite, ferrocyanides, ferricyanides, manganese violet (manganese ammonium pyrophosphate), various aluminum salts and so on. Pigment precursors including, but not limited to, those described in U.S. Pat. No. 6,524, 382, the disclosure of which is incorporated herein by reference, may also be applicable in this application.

Suitable commercially available pigment dispersions include, but are not limited to, BLAZE ORANGE ECX 15 (DayGlo, OH), CORONA MAGENTA ECX-21 (DayGlo), and LUMIKOL Fluorescent Pigment Dispersions (United Mineral & Chemical Corp, NJ). Other DayGlo ECX pigment dispersions may be also suitable for use as the pigment dispersion.

The pigment dispersion can be included in the ink formulation in a range of about 1 wt. % to about 20 wt. %, about 5 wt. % to about 15 wt. %, and about 7 wt. % to about 10 wt. % based on the total weight of the ink formulation. Specific suitable amounts include, for example, about 1, 2, 3, 4, 5, 6, 7, 8, 9, 10, 11, 12, 13, 14, 15, 16, 17, 18, 19, and 20 wt. % based on the total weight of the ink formulation.

The pigment dispersion can further include one or more additives, including, for example, a surfactant and/or dispersing aid. Exemplary dispersing aids include, but are not limited to, dispersing aids sold under the SOLSPERSE™ trade name, including, SOLSPERSE™ 44000 (Lubrizol Advanced Materials, Inc., Manchester UK), the NUOSPERSE® trade name, for example, NUOSPERSE® FA 196 (Elementis Specialty, NJ), the TEGO® trade name, for example, TEGO® Dispers 652 (Tego Chemie Service USA, VA); and YELKIN® TS lecithin (Archer Daniels Midland Company, Decatur, Ill.).

Additives

The ink formulation can include one or more additives. The additives can include, for example, biocides, pH adjusters, lightfastness imparting agents, and sometimes humectants.

Suitable biocides include, for example, ACTICIDE B-20 (Thor Specialties, Inc., CT), and broad-spectrum biocides, such as, 1,2,-benzisothiazolin-3-one, sold as a solution or dispersion under the trade name PROXEL. Examples of suitable biocides include, but are not limited to, PROXEL GXL, PROXEL BD20, and PROXEL XL2 (Avecia Biocides, Wilmington, Del.) Other suitable biocides include, but are not limited to, potassium sorbate, sodium benzoate, and pentachlorophenyl sodium. The biocide can be included in the ink formulation in an amount in a range of about 0.01 wt. % to about 20 wt. %, about 0.05 wt. % to about 15 wt. %, about 0.05 wt. % to about 10 wt. %, about 0.1 wt. % to about 10 wt. %, about 0.5 wt. % to about 5 wt. %, about 1 wt. % to about 10 wt. %, about 5 wt. % to about 7 wt. % based on the total weight of the ink formulation. Specific amounts of biocide include, but are not limited to, about 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 1, 5, 10, 15, and 20 wt. % based on the total weight of the ink formulation.

Suitable pH adjusters include, for example, urea and triethanolamine, available, for example, from Univar USA as Triethanol Amine 9. The pH adjuster can be included in the ink formulation in a range of about 0.01 wt. % to about 20 wt. %, about 0.05 wt. % to about 15 wt. %, about 0.05 wt. % to about 10 wt. %, about 0.1 wt. % to about 10 wt. %, about 0.5 wt. % to about 5 wt. %, about 1 wt. %, to about 10 wt. %, about 5 wt. % to about 7 wt. % based on the total weight of the ink formulation. Other suitable amounts include about 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 1, 5, 10, 15, and 20 wt. % based on the total weight of the ink formulation.

Suitable lightfastness imparting agents include, for example, antioxidants, antiozonants, UV absorbing compounds, and the like, as well as mixtures thereof For example, the lightfastness imparting agent can be sucrose (for example, pure cane sugar). Specific examples of suitable lightfastness imparting agents include UV absorbing compounds, such as glycerol p-amino benzoate, available as ESCALOL 106 (Van Dyk Corporation); resorcinol mono benzoate, available as RBM (Eastman Chemicals); octyl dimethyl amino benzoate, available as ESCALOL 507 (Van Dyk Corporation); hexadecyl 3,5-di-tert-butyl-4-hydroxy-benzoate, available as CYASORB UV-2908 and as 41,320-8 (Aldrich Chemical Company); octyl salicylate, available as ESCALOL 106 (Van Dyk Corporation); octyl methoxy cinnamate, available as PARASOL MCX (Givaudan Corporation); 4-allyloxy-2-hydroxy-benzophenone, available as UVINUL 600 and as 41,583-9 (Aldrich Chemical Company); 2-hydroxy-4-methoxy benzophenone, available as ANTI UVA (Acto Corporation); 2,2'-dihydroxy-4,4'-dimethoxy benzophenone, available as UVINUL D 49 and as D11,100-7 (Aldrich Chemical Company); 2-hydroxy-4-(octyloxy)benzophenone, available as CYASORB UV-531 and as 41,315-1 (Aldrich Chemical Company); 2-hydroxy-4-dodecyloxy benzophenone, available as DOBP (Eastman Chemicals); 2-(2'-hydroxy-5'-methylphenyl)benzotriazole, available as TINUVIN 900 (Ciba Geigy Corporation); 2-(2'-hydroxy-3,5-di-(1,1-dimethyl benzyl)phenyl)-2H-benzotriazole, available as TOPANEX 100 BT (ICI America Corporation); bis(2-hydroxy-5-tortoctyl-3-(benzotriazol-2-yl)) phenyl methane, available as MIXXIM BB/100 (Fairmount Corporation); 2-(3',5'-di-toributyl-2'-hydroxyphenyl)-5-chlorobenzotriazole, available as TINUVIN 327 (Ciba Geigy Corporation); 2-(4-benzoyl-3-hydroxyphenoxy)ethylacrylate available as CYASORB UV-416 and as 41,321-6 (Aldrich Chemical Company); poly (2-(4-benzoyl-3-hydroxyphenoxy)ethylacrylate) available as CYASORB UV-2126 and as 41,323-2 (Aldrich Chemical Company); N-(ρ-ethoxycarbonyl phenyl)-N'-ethyl-N'-phenyl formadine, available as GIVESORB UV-2 (Givaudan Corporation); 1,1-(1,2-ethane-diyl)bis(3,3,5,5-tetramethyl piperazinone), available as GOOD-RITE UV 3034 (Goodrich Chemicals); tris(3,5di-tert-butyl-4-hydroxybenzyl)isocyanurate, available as GOOD-RITE UV 3114 (Goodrich Chemicals), nickel bis(o-ethyl(3,5-di-tert-butyl-4-hydroxybenzyl) phosphonate), available as IRGASTAB 2002 (Ciba Geigy Corporation); (2,2,6,6-tetramethyl-4-piperidinyl)-1,2, 3,4-butane tetracarboxylate), available as MIXXIM HALS 57 (Fairmount Corporation); (2,2,6,6-tetramethyl-4-piperidinyl-β,β,β,β-tetramethyl-3,9-(2,4,8,10-tetraoxo spiro(5,5)undecane)diethyl)-1,2,3,4-butane tetracarboxylate, available as MIXXIM HALS 68 (Fairmount Corporation); (1,2,2,6,6-pentamethyl-4-piperidinyl-β,β,β,β-tetramethyl-3,9-(2,4,8, 10-tetra oxospiro(5,5)undecane)diethyl)-1,2,3,4-butane tetracarboxylate, available as MIXXIM HALS 63 (Fairmount Corporation); 2-dodecyl-N-(2,2,6,6-tetramethyl-4-piperidinyl)succinimide, available as CYASROB UV-3581 and as 41,317-8 (Aldrich Chemical Company); 2-dodecyl-N-(1,2,2, 6,6-pentamethyl-4-piperidinyl) succinimide, available as CYASORB UV-3604 and as 41,3186 (Aldrich Chemical Company); N-(1-acetyl-2,2,6,6-tetramethyl-4-piperidinyl)-2-dodecyl succinimide, available as CYASORB UV-3668 and as 41,319-4, (Aldrich Chemical Company); tetrasodium N-(1,2-dicarboxyethy))-N-octadecyl sulfosuccinamate, available as AEROSOL 22N (American Cyanamid Corporation); nickel dibutyldithiocarbamate, available as UV-CHEK AM-105 (Ferro Corporation); poly(4-hydroxy-2,2,6,6-tetramethyl-1-piperidine ethanol/dimethyl succinic acid), available as TINUVIN 622LD (Ciba-Geigy Corporation); poly(3, 5-di-tert-butyl-4-hydroxy hydrocinnamic acid ester)/1,3,5-tris(2-hydroxyethyl)-5-triazine-2,4,6(1H,3H,5H)-trione, available as GOOD-RITE 3125 (Goodrich Chemicals); poly (N,N-bis(2,2,6,6-tetramethyl-4-piperidinyl)-1,6-hexanediamine-co-2,4-dichloro-6-morpholino-1,3,5-triazine), available as CYASORB UV-3346 and as 41,3240 (Aldrich Chemical Company); 1-(N-(poly(3-allyloxy-2-hydroxypropyl)-2-aminoethyl)-2-imidazolidinone, available as 41,026-8 (Aldrich Chemical Company); poly(2-ethyl-2-oxazoline), available as 37,284-6, 37,285-4, 37,397-4 (Aldrich Chemical Company), and the like, as well as mixtures thereof.

Examples of suitable antioxidants include didodecyl 3,3'-thiodipropionate, available as CYANOX LTDP, and as D12, 840-6 (Aldrich Chemical Company); ditridecyl 3,3'-thiodipropionate, available as CYANOX 711 and as 41,311-9 (Aldrich Chemical Company); ditetradecyl 3,3'-thiodipropionate, available as CYANOX MTDP and as 41,312-7 (Aldrich Chemical Company); dicetyl 3,3'-thiodipropionate, available as EVANSTAB 16 (Evans Chemetics Corporation); dioctadecy) 3,3'-thiodipropionate, available as CYANOX STDP and as 41,310-0 (Aldrich Chemical Company); triethyleneglycol bis(3-(3'-tert-butyl-4'-hydroxy-5'-methylphenyl) propionate), available as IRGANOX 245 (Ciba-Geigy Corporation); octadecyl 3-(3,5-di-tert-butyl-4-hydroxyphenyl)propionate, available as ULTRANOX 276 (General Electric Company); 1,6-hex bis(3,5-di-tert-butyl-4-hydroxy hydrocinnamate), available as IRGANOX 259 (Ciba-Geigy Corporation); tetrakis(methylene(3,5-di-tert-hutyl-4-hydroxy hydrocinnamate)), available as IRGANOX 1010 (Ciba-Geigy Corporation); thiodiethylenebis(3,5di-tert-butyl-4-hydroxy)hydrocinnamate, available as IRGANOX 1035 (Ciba-Geigy Corporation); octadecyl 3,5-di-ted-butyl-4-hydroxy hydrocinnamate, available as IRGANOX 1076 (Ciba-Geigy Corporation); N,N'-hexamethylenebis(3,5di-tert-butyl-4-hydroxy hydrocinnamide), available as IRGANOX 1098 (Ciba-Geigy Corporation); 2,2-bis(4-(2-(3,5-di-tert-butyl-4-hydroxyhydrocinnamoyloxy))ethoxy phenyl) propane, available as TOPANOL 205 (ICI America Corporation); N-stearoyl-ρ-aminophenol, available as SUCNOX-18 (Hexcel Corporation); 2,6-di-tert-butyl-4-methyl phenol, available as ULTRANOX 226 (General Electric Company); 2,6-di-tert-butyl-ρ-cresol, available as VULKANOX KB (Mobay Chemicals); 2,6-di-tert-butyl-α-dimethylamino-ρ-cresol, available as ETHANOX 703 (Ethyl Corporation); 2,2'-isobutylidene-bis(4,6-dimethyl phenol), available as VULKANOX NKF (Mobay Chemicals); 2,2'-methylenebis (6-tert-butyl-4-methy)phenol), available as CYANOX 2246 and as 41,315-5 (Aldrich Chemical Company); 2,2'-methylene bis(6-tert-butyl-4-ethylphenol), available as CYANOX 425 and as 41,314-3 (Aldrich Chemical Company); tris(4-tert-butyl-3-hydroxy-2,6-dimethylbenzyl)isocyanurate, available as CYANOX 1790 and as 41,322-4 LTDP and D12, 840-6 (Aldrich Chemical Company); 1,3,5-trimethyl-2,4,6-tris(3,5-di-tert-butyl-4-hydroxybenzyl) benzene, available as ETHANOX 300 and as 41,328-3 (Aldrich Chemical Company); triphenyl phosphite, available as LANKROMARK LE65 (Harcros Corporation); tris(nonyl phenyl)phosphite, available as LANKROMARK LE 109 (Harcros Corporation); tris(2,4-di-tert-buty)-phenyl)phosphite, available as WYTOX 240 (Olin Corporation 2,2'-ethylidene bis(4,6-di-tert-butylphenyl) fluorophosphonite, available as ETHANOX 398 (Ethyl Corporation); octylated diphenylamine, available as ANCHOR ODPA (Anchor Corporation); N,N'-β,β-naphthalene-ρ-phenylenediamine, available as ANCHOR DNPD (Anchor Corporation); 4,4'-methylene-bis (dibutyldithio carbamate), available as VANLUBE 7723 (Vanderbilt Corporation); antimony dialkyldithio carbamate, available as VANLUBE 73 (Vanderbilt Corporation), antimony dialkylphosphorodithioate, available as VANLUBE 622 (Vanderbilt Corporation); molybdenum oxysulfide dithio carbamate, available as VANLUBE 622 (Vanderbilt Corporation); 2,2,4-trimethyl-1,2-hydroquinoline, available as VULKANOX HS (Mobay Corporation); and the like, as well as mixtures thereof.

Examples of suitable antiozonants include N-isopropyl-N'-phenyl-phenylene diamine, available as SANTOFLEX IP (Monsanto Chemicals), N-(1,3-dimethylbutyl)-N'-phenyl-phenylene diamine, available as SANTOFLEX 13 (Monsanto Chemicals); N,N'-di(2-octyl)-p-phenylene diamine, available as ANTOZITE-1 (Vanderbilt Corporation), N,N'-bis(1,4-dimethyl pentyl)-ρ-phenylene diamine, available as SANTOFLEX 77 (Monsanto Chemicals); 2,4,6-tris-(N-1,4-dimethyl pentyl-ρ-phenylene diamino)-1,3,5-triazine, available as DURAZONE 37 (Uniroyal Corporation): 6ethoxy-1, 2-dihydro-2,2,4-trimethyl quinoline, available as SANTOFLEX AW (Monsanto Chemicals): bis(1,2,3,6tetrahydrobenzaldehyde) pentaerythritol acetal, available as VULKAZON AFS/LG (Mobay Corporation); paraffin wax, available as PETROLITE C-700 and PETROLITE C-1035 (Petrolite Corporation); and the like, as well as mixtures thereof.

The lightfastness imparting agent can be included in the ink formulation in a range of about 1 wt. % to about 40 wt. %, about 5 wt. % to about 30 wt. %, and about 10 wt. % to about 20 wt. % based on the total weight of the ink formulation. Specific amounts of the lightfastness imparting agent include, but are not limited to, about 1, 5, 10, 15, 20, 25, 30, 35, and 40 wt. % based on the total weight of the ink formulation.

Writing Instruments

Suitable writing instruments to deliver the highlighting ink formulation include, but are not limited to, pens, such as, for example, ball-point pens and porous tip pens, and markers, such as, for example, capillary action markers, valve action markers, and the like. In each of the foregoing, the writing instruments generally include a reservoir containing the ink formulation and a writing point or nib coupled to and in fluid communication with reservoir. The reservoirs should generally be inert to the ink formulations according to the disclosure. An example of a suitable reservoir is a melt-blown fibrous reservoir from Filtrona Company (Colonial Height, Va.). The reservoirs can be of any dimensions as long as the dimensions are sufficient for storing a predetermined amount of the ink formulation and for permitting the reservoir to fit into the desired marker body or other writing instrument housing. Reservoirs for use in the markers according to the disclosure preferably have a reservoir fiber density between about 0.10 gram/cubic centimeter (g/cc) and about 0.50 g/cc. The reservoir fibers can be manufactured from thermoplastic polymers such as, for example, polyesters, nylons, polypropylenes, and mixtures thereof. The fibers inside the reservoir can be linearly-oriented or entangled. To maintain the integrity of the ink reservoir towards aggressive solvents, the reservoir can be wrapped with a sheet of polypropylene or nylon.

The writing points or nibs should allow for continual delivery of the ink formulations contained in the reservoirs. Fibers of the nibs should be compatible with the various solvent systems of the compositions. An exemplary nib is a polyester/urethane nib supplied by Teibow (GW402). Suitable nib fibers can be manufactured from thermoplastic polymers such as, for example, polyester, polypropylene, nylon, and mixtures thereof. The nib fibers are typically bound by a second resin, which also should be insoluble in the ink formulation solvent system. Exemplary second resins include polyacetal and melamine For example, the writing instrument can be a capillary action marker, which generally includes a reservoir for storing the ink formulation coupled to and in fluid communication with a porous nib. The capillary action marker includes a porous reservoir for storing the ink formulation joined in capillary coupling relation to a porous nib. Both capillary action markers and valve action markers are known. Suitable capillary action makers are described, for example, in U.S. Pat. No. 7,364,614, the entire disclosure of which is herein incorporated by reference.

Viscosity

The viscosity of the ink formulation at about 25° C. can be between about 1 centipoises (cP) and 40 cP, for example, between about 2 cP and about 10 cP, about 3 cP and about 15 cP, about 1 cP and about 40 cP, about 5 cP and 10 cP, about 3 cP and about 4 cP, about 4 cP and about 5 cP, and about 5 cP to about 6 cP, as measured by a Brookfield viscosity meter. Specific Brookfield viscosities include, for example, about 2, 3, 4, 5, 6, 7, 8, 9, 10, 11, 12, 13, 14, 15, 16, 17, 18, 19, and 20 cP. However, the ranges provided above can shift higher or lower depending on the nature of the writing instrument, and, for example, the porosity of the nibs and/or the fiber density of the ink reservoirs (if employed).

pH

The pH of the ink formulation is generally in a range of about 7 to about 11, about 8 to about 10, about 7 to 10, about 7.5 to about 10.5, and about 7.5 to about 8.5. For example, the ink formulation can have a pH of about 7, 7.5, 8, 8.5, 9, 9.5, 10, 10.5, or 11.

Surface Tension

The ink formulation can have a surface tension in a range of about 25 mN/M to about 70 mN/M, about 30 mN/M to about 65 mN/M, about 35 mN/M to about 60 mN/M, about 40 mN/M to about 50 mN/M, about 55 mN/M to about 70 mN/M, about 50 mN/M to about 60 mN/M, and about 25 mN/M to about 40 mN/M. For example, the ink formulation can have a surface tension of about 25, 30, 35, 40, 45, 50, 55, 60, 65, or 70 mN/M.

Conductivity

The ink formulation can have a conductivity in a range of about 10 ms to about 40 ms, about 15 ms to about 35 ms, and about 20 ms to about 30 ms. For example, the ink formulation can have a conductivity of about 10, 15, 20, 25, 30, 35, or 40 ms.

Specific Gravity

The ink formulation can have a specific gravity of about 1 to about 2, about 1.1 to about 1.8, about 1.1 to about 1.15, about 1.15 to about 1.3, and about 1.2, to about 1.5. For example, the ink formulation can have a specific gravity of about 1, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2.

EXAMPLES

Example 1

A yellow ink was prepared by mixing deionized water with lithium chloride in a container for about 15 minutes. Sodium acetate was then added slowly to the mixture and mixing was continued for about 15 additional minutes. Pure cane powered sugar (sucrose) was added to the mixture and the mixture was stirred for about 1 to 10 more minutes. Glycerin, ACTICIDE B-20, and triethanolamine were added to the mixture and mixing was continued for about 5 additional minutes. Finally, pyranine conc. 1020 dye was added to the container and the mixture was mixed for about 30 additional minutes. The components were used in the amounts shown below.

| Component | Function | Amount |
| --- | --- | --- |
| Deionized Water | Solvent | 63.58 wt. % |
| Lithium Chloride | Anti-Smear Agent | 8.3 wt. % |
| Sodium Acetate | Anti-Smear Agent | 4.2 wt. % |
| Pure Cane Powdered Sugar (Sucrose) | Lightfastness imparting agent | 12.5 wt. % |
| Glycerin | Co-Solvent | 8.3 wt. % |
| ACTICIDE B-20 | Biocide | 0.17 wt. % |
| Triethanol Amine 9 | pH adjuster | 1.7 wt. % |
| Pyranine conc. 1020 | Dye | 1.25 wt. % |

The ink had a Brookfield viscosity at 25° C. in a range of about 4 to about 5.2 cP, a pH in a range of about 7.5 to about 10.5, a surface tension in a range of about 55 to about 70 mN/M, and a specific gravity in a range of about 1.15 to about 1.2.

Example 2

A green ink was prepared by mixing deionized water with sodium acetate in a container for about 15 minutes. Pure cane powered sugar (sucrose) was added to the mixture and mixing was continued for about 1 to 10 additional minutes. Propylene glycol, ACTICIDE B-20, and triethanolamine were added to the mixture and mixing was continued for about 5 more minutes. Finally, pyranine conc. 1020 and SPECTRAMINE TURQUOISE G LIQUID were added to the mixture and mixing was continued for about 30 additional minutes. The components were used in the amounts shown below.

| Component | Function | Amount |
| --- | --- | --- |
| Deionized Water | Solvent | 60.8 wt. % |
| Sodium Acetate | Anti-Smear Agent | 10 wt. % |
| Pure Cane Powdered Sugar (Sucrose) | Lightfastness imparting agent | 15 wt. % |
| Propylene glycol | Co-Solvent | 9 wt. % |
| ACTICIDE B-20 | Biocide | 0.2 wt. % |
| Triethanol Amine 9 | pH adjuster | 3 wt. % |
| Pyranine conc. 1020 | Dye | 1.5 wt. % |
| SPECTRAMINE TURQUOISE G LIQUID | Dye Solution | 0.5 wt. % |

The ink had a Brookfield viscosity at 25° C. in a range of about 5 to about 6 cP, a pH in a range of about 7.5 to about 10.5, a surface tension in a range of about 50 to about 60 mN/M, and a specific gravity in a range of about 1.15 to about 1.2.

Example 3

A blue ink was prepared by mixing deionized water with lithium chloride in a container for about 15 minutes. Pure cane powered sugar was added to the mixture and mixing was continued for about 1 to 10 additional minutes. Propylene glycol and ACTICIDE B-20 were added to the mixture and mixing was continued for about 5 more minutes. Finally, HIDACID® FTM Blue 9 was added to the mixture and mixing continued for about 30 additional minutes. The components were used in the amounts shown below.

| Component | Function | Amount |
| --- | --- | --- |
| Deionized Water | Solvent | 67.3 wt. % |
| Lithium Chloride | Anti-Smear Agent | 8 wt. % |
| Pure Cane Powdered Sugar (Sucrose) | Lightfastness imparting agent | 15 wt. % |
| Propylene glycol | Co-Solvent | 9 wt. % |
| ACTICIDE B-20 | Biocide | 0.2 wt. % |
| HIDACID ® FTM Blue 9 | Dye | 0.5 wt. % |

The ink had a Brookfield viscosity at 25° C. in a range of about 3 to about 4 cP, a pH in a range of about 7 to about 8.5, a surface tension in a range of about 45 to about 60 mN/M, and a specific gravity in a range of about 1.1 to about 1.15.

Example 4

An orange ink was prepared by mixing deionized water with sodium acetate in a container for about 15 minutes. Pure cane powered sugar was added to the mixture and mixing was continued for about 1 to 10 additional minutes. Propylene glycol and ACTICIDE B-20 were added to the mixture and mixing was continued for about 5 more minutes. SPECTRA EOSINE OJ conc. and SPECTRACIDE URANINE Crude were added to the mixture and mixing was continued for about 30 additional minutes. BLAZE ORANGE ECX 15 (DayGlo) pigment dispersion was then added to the mixture and mixing was continued for about 15 minutes. The components were used in the amounts shown below.

| Component | Function | Amount |
| --- | --- | --- |
| Deionized Water | Solvent | 60.2 wt. % |
| Sodium Acetate | Anti-Smear Agent | 10 wt. % |
| Pure Cane Powdered Sugar (Sucrose) | Lightfastness imparting agent | 10 wt. % |
| Propylene glycol | Co-Solvent | 9 wt. % |
| ACTICIDE B-20 | Biocide | 0.2 wt. % |
| SPECTRA EOSINE OJ Conc. | Dye | 0.1 wt. % |
| SPECTRACID URANINE CRUDE | Dye | 0.5 wt. % |
| BLAZE ORANGE EXC 15 | Pigment Dispersion | 10 wt. % |

The ink had a Brookfield viscosity at 25° C. in a range of about 4 to about 5 cP, a pH in a range of about 7 to about 8.5, a surface tension in a range of about 25 to about 40 mN/M, and a specific gravity in a range of about 1.1 to about 1.15.

Example 5

An orange ink was prepared by mixing deionized water with sodium acetate in a container for about 15 minutes. Pure cane powered sugar was added to the mixture and mixing was continued for about 1 to 10 additional minutes. Propylene glycol and ACTICIDE B-20 were added to the mixture and mixing was continued for about 5 more minutes. SPECTRA EOSINE OJ conc. and SPECTRACIDE RHODAMINE BIJ Crude were added to the mixture and mixed for about 30 additional minutes. BLAZE ORANGE EXC 15 (DayGlo) pigment dispersion was then added to the mixture and mixing was continued for about 15 minutes. The components were used in the amounts shown below.

| Component | Function | Amount |
| --- | --- | --- |
| Deionized Water | Solvent | 70.25 wt. % |
| Sodium Acetate | Anti-Smear Agent | 10 wt. % |
| Pure Cane Powdered Sugar (Sucrose) | Lightfastness imparting agent | 10 wt. % |
| Propylene glycol | Co-Solvent | 9 wt. % |
| ACTICIDE B-20 | Biocide | 0.2 wt. % |
| SPECTRA EOSINE OJ Conc. | Dye | 0.5 wt. % |
| SPECTRA RHODAMINE BIJ Crude | Dye | 0.05 wt. % |
| BLAZE ORANGE ECX 15 | Pigment Dispersion | 10 wt. % |

The ink had a Brookfield viscosity at 25° C. of about 4.2 cP, a pH in a range of about 7 to about 8.5, a surface tension in a range of about 40 to about 50 mN/M, and a specific gravity in a range of about 1.1 to about 1.15.

Example 6

An orange ink was prepared by mixing deionized water with sodium acetate in a container for about 15 minutes. Pure cane powered sugar was added to the mixture and mixing was continued for about 1 to 10 additional minutes. Propylene glycol and ACTICIDE B-20 were added to the mixture and mixing was continued for about 5 more minutes. SPECTRA EOSINE OJ conc. was added to the mixture and mixing was continued for about 30 additional minutes. CORONA MAGENTA ECX-21 (DayGlo) pigment dispersion was then added to the mixture and mixing was continued for about 15 more minutes. The components were used in the amounts shown below.

| Component | Function | Amount |
| --- | --- | --- |
| Deionized Water | Solvent | 64.7 |
| Sodium Acetate | Anti-Smear Agent | 10 wt. % |
| Pure Cane Powdered Sugar (Sucrose) | Lightfastness imparting agent | 10 wt. % |
| Propylene glycol | Co-Solvent | 9 wt. % |
| ACTICIDE B-20 | Biocide | 0.2 wt. % |
| SPECTRA EOSINE OJ Conc. | Dye | 0.1 wt. % |
| CORONA MAGENTA ECX-21 | Pigment Dispersion | 6 wt. % |

The ink had a Brookfield viscosity in a range of about 3 to about 4 cP, a pH in a range of about 7 to about 8.5, a surface tension in a range of about 24 to about 40 mN/M, and a specific gravity in a range of about 1.1 to about 1.15.

Example 7

A yellow ink, also referred to herein as A29, was prepared by mixing deionized water with lithium chloride in a container for about 15 minutes. Pure cane powered sugar was added to the mixture and mixing was continued for about 1 to 10 additional minutes. Glycerin, ACTICIDE B-20, and tri-ethanolamine were added to the mixture and mixing was continued for about 5 more minutes. Finally, Pyranine CONC. 1020 dye was added to the mixture and mixing was continued for about 30 additional minutes. The components were used in the amounts shown below.

| Component | Function | Amount |
|---|---|---|
| Deionized Water | Solvent | 40.8 wt. % |
| Lithium Chloride | Anti-Smear Agent | 10 wt. % |
| Pure Cane Powdered Sugar (Sucrose) | Lightfastness imparting agent | 15 wt. % |
| Urea | pH Adjuster | 15 wt. % |
| Glycerin | Co-Solvent | 15 wt. % |
| ACTICIDE B-20 | Biocide | 0.2 wt. % |
| Triethanol Amine 9 | pH adjuster | 2 wt. % |
| Pyranine conc. 1020 | Dye | 2 wt. % |

The ink had a Brookfield viscosity of about 11.7 cP, a pH of about 8.3, and a surface tension of about 43.37 mN/M.

Example 8

A yellow ink was prepared by mixing deionized water with lithium chloride in a container for about 15 minutes. Sodium acetate was added to the mixture and mixing was continued for about 15 additional minutes. Pure cane powered sugar was added to the mixture and mixing was continued for about 1 to 10 more minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 56.3 wt. % |
| Lithium Chloride | Anti-Smear Agent | 10 wt. % |
| Sodium Acetate | Anti-Smear Agent | 5 wt. % |
| Pure Cane Powdered Sugar (Sucrose) | Lightfastness imparting agent | 15 wt. % |
| Glycerin | Co-Solvent | 10 wt. % |
| ACTICIDE B-20 | Biocide | 0.2 wt. % |
| Triethanol Amine 9 | pH adjuster | 2 wt. % |
| Pyranine conc. 1020 | Dye | 1.5 wt. % |

The ink had a Brookfield viscosity of about 6.3 cP, a pH of about 8.85, a surface tension of about 34.23 mN/M, and a conductivity of about 34.4 ms.

Example 9

A yellow ink was prepared by mixing deionized water with magnesium chloride hexahydrate in a container for about 15 minutes. Sodium acetate was added to the mixture and mixing was continued for about 15 additional minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 51.3 wt. % |
| Magnesium Chloride Hexahydrate ($MgCl_2 6H_2O$) | Anti-Smear Agent | 10 wt. % |
| Sodium Acetate | Anti-Smear Agent | 10 wt. % |
| Pure Cane Powdered Sugar (Sucrose) | Lightfastness imparting agent | 15 wt. % |
| Glycerin | Co-Solvent | 10 wt. % |
| ACTICIDE B-20 | Biocide | 0.2 wt. % |
| Triethanol Amine 9 | pH adjuster | 2 wt. % |
| Pyranine conc. 1020 | Dye | 1.5 wt. % |

The ink had a Brookfield viscosity of about 6.61 cP, a pH of about 9.01, a surface tension of about 36.47 mN/M, and a conductivity of about 24.6 ms.

Example 10

A yellow ink was prepared by mixing deionized water with magnesium chloride hexahydrate in a container for about 15 minutes. Potassium acetate was added to the mixture and mixing was continued for about 15 additional minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 51.3 wt. % |
| Magnesium Chloride Hexahydrate ($MgCl_2 6H_2O$) | Anti-Smear Agent | 10 wt. % |
| Potassium Acetate | Anti-Smear Agent | 10 wt. % |
| Pure Cane Powdered Sugar (Sucrose) | Lightfastness imparting agent | 15 wt. % |
| Glycerin | Co-Solvent | 10 wt. % |
| ACTICIDE B-20 | Biocide | 0.2 wt. % |
| Triethanol Amine 9 | pH adjuster | 2 wt. % |
| Pyranine conc. 1020 | Dye | 1.5 wt. % |

The ink had a Brookfield viscosity of about 5.28 cP, a pH of about 9.2, a surface tension of about 42.35 mN/M, and a conductivity of about 30.5 ms.

Example 11

A yellow ink was prepared by mixing deionized water with sodium acetate in a container for about 15 minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 52.3 wt. % |
| Sodium Acetate | Anti-Smear Agent | 10 wt. % |
| Pure Cane Powdered Sugar (Sucrose) | Lightfastness imparting agent | 25 wt. % |
| Glycerin | Co-Solvent | 10 wt. % |
| ACTICIDE B-20 | Biocide | 0.2 wt. % |

-continued

| Component | Function | Amount |
|---|---|---|
| Triethanol Amine 9 | pH adjuster | 1 wt. % |
| Pyranine conc. 1020 | Dye | 1.5 wt. % |

The ink had a Brookfield viscosity of about 8.16 cP, a pH of about 8,83, a surface tension of about 53.31 mN/M, and a conductivity of about 13.6 ms.

Example 12

A yellow ink was prepared by mixing deionized water with potassium acetate in a container for about 15 minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 52.3 wt. % |
| Potassium Acetate | Anti-Smear Agent | 10 wt. % |
| Pure Cane Powdered Sugar (Sucrose) | Lightfastness imparting agent | 25 wt. % |
| Glycerin | Co-Solvent | 10 wt. % |
| ACTICIDE B-20 | Biocide | 0.2 wt. % |
| Triethanol Amine 9 | pH adjuster | 1 wt. % |
| Pyranine conc. 1020 | Dye | 1.5 wt. % |

The ink had a Brookfield viscosity of about 6.16 cP, a pH of about 9.01, a surface tension of about 52.46 mN/M, and a conductivity of about 18.3 ms.

Example 13

A yellow ink was prepared by mixing deionized water with sodium chloride in a container for about 15 minutes. Sodium acetate was added to the mixture and mixing was continued for about 15 additional minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 52.3 wt. % |
| Sodium Chloride | Anti-Smear Agent | 10 wt. % |
| Sodium Acetate | Anti-Smear Agent | 10 wt. % |
| Pure Cane Powdered Sugar (Sucrose) | Lightfastness imparting agent | 15 wt. % |
| Glycerin | Co-Solvent | 10 wt. % |
| ACTICIDE B-20 | Biocide | 0.2 wt. % |
| Triethanol Amine 9 | pH adjuster | 1 wt. % |
| Pyranine conc. 1020 | Dye | 1.5 wt. % |

The ink had a Brookfield viscosity of about 7.98 cP, a pH of about 8.83, a surface tension of about 52.38 mN/M, and a conductivity of about 33.5 ms.

Example 14

A yellow ink was prepared by mixing deionized water with sodium acetate in a container for about 15 minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 57.3 wt. % |
| Sodium Acetate | Anti-Smear Agent | 10 wt. % |
| Pure Cane Powdered Sugar (Sucrose) | Lightfastness imparting agent | 25 wt. % |
| Glycerin | Co-Solvent | 5 wt. % |
| ACTICIDE B-20 | Biocide | 0.2 wt. % |
| Triethanol Amine 9 | pH adjuster | 1 wt. % |
| Pyranine conc. 1020 | Dye | 1.5 wt. % |

The ink had a Brookfield viscosity of about 6.06 cP.

Example 15

A yellow ink was prepared by mixing deionized water with lithium chloride in a container for about 15 minutes. Potassium acetate was added to the mixture and mixing was continued for about 15 additional minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 56.3 wt. % |
| Lithium Chloride | Anti-Smear Agent | 10 wt. % |
| Potassium Acetate | Anti-Smear Agent | 5 wt. % |
| Pure Cane Powdered Sugar (Sucrose) | Lightfastness imparting agent | 15 wt. % |
| Glycerin | Co-Solvent | 10 wt. % |
| ACTICIDE B-20 | Biocide | 0.2 wt. % |
| Triethanol Amine 9 | pH adjuster | 2 wt. % |
| Pyranine conc. 1020 | Dye | 1.5 wt. % |

The ink had a Brookfield viscosity of about 5.49 cP.

Example 16

A yellow ink was prepared by mixing deionized water with sodium chloride in a container for about 15 minutes. Sodium acetate was added to the mixture and mixing was continued for about 15 additional minutes. Pure cane powered sugar (sucrose) was added to the mixture and mixing was continued for about 1 to 10 additional minutes. Glycerin, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 57.3 wt. % |
| Sodium Chloride | Anti-Smear Agent | 10 wt. % |
| Sodium Acetate | Anti-Smear Agent | 10 wt. % |
| Pure Cane Powdered Sugar (Sucrose) | Lightfastness imparting agent | 15 wt. % |
| Glycerin | Co-Solvent | 5 wt. % |
| ACTICIDE B-20 | Biocide | 0.2 wt. % |
| Triethanol Amine 9 | pH adjuster | 1 wt. % |
| Pyranine conc. 1020 | Dye | 1.5 wt. % |

The ink had a Brookfield viscosity of about 5.73 cP and surface tension 37.8.

Example 17

A yellow ink was prepared by mixing deionized water with lithium chloride in a container for about 15 minutes. Pure cane powered sugar (sucrose) was added to the mixture and mixing was continued for about 1 to 10 additional minutes. Propylene glycol, SOLSPERSE 44000, ACTICIDE B-20, and triethanolamine were added to the mixture and mixing was continued for about 5 more minutes. Finally, pyranine conc. 1020 dye was added to the mixture and mixing was continued for about 30 additional minutes. The components were used in the amounts shown below.

| Component | Function | Amount |
|---|---|---|
| Deionized Water | Solvent | 54.8 wt. % |
| Lithium Chloride | Anti-Smear Agent | 10 wt. % |
| Pure Cane Powdered Sugar (Sucrose) | Lightfastness imparting agent | 15 wt. % |
| Urea | pH Adjuster | 7 wt. % |
| Propylene Glycol | Co-Solvent | 9 wt. % |
| ACTICIDE B-20 | Biocide | 0.2 wt. % |
| SOLSPERSE 44000 | Dispersing Agent | 0.5 wt. % |
| Triethanol Amine 9 | pH adjuster | 2 wt. % |
| Pyranine conc. 1020 | Dye | 1.5 wt. % |

Example 18

A green ink was prepared by mixing deionized water with sodium chloride in a container for about 15 minutes. Sodium acetate was added to the mixture and mixing was continued for about 15 additional minutes. Pure cane powered sugar (sucrose) was added to the mixture and mixing was continued for about 1 to 10 additional minutes. Propylene glycol, ACTICIDE B-20, and triethanolamine were added to the mixture and mixing was continued for about 5 more minutes. Finally, pyranine conc. 1020 dye and PONTAMINE FAST TURQUOISE 8GL Liquid dye were added to the mixture and mixing was continued for about 30 additional minutes. The components were used in the amounts shown below.

| Component | Function | Amount |
|---|---|---|
| Deionized Water | Solvent | 55.8 wt. % |
| Sodium Chloride | Anti-Smear Agent | 8 wt. % |
| Sodium Acetate | Anti-Smear Agent | 8 wt. % |
| Pure Cane Powdered Sugar (Sucrose) | Lightfastness imparting agent | 15 wt. % |
| Propylene Glycol | Co-Solvent | 9 wt. % |
| ACTICIDE B-20 | Biocide | 0.2 wt. % |
| Triethanol Amine 9 | pH adjuster | 1 wt. % |
| Pyranine conc. 1020 | Dye | 2 wt. % |
| PONTAMINE FAST TURQUIOSE 8GL Liquid | Dye | 1 wt. % |

Example 19

A blue ink was prepared by mixing deionized water with lithium chloride in a container for about 15 minutes. Pure cane powered sugar (sucrose) was added to the mixture and mixing was continued for about 1 to 10 additional minutes. Propylene glycol and ACTICIDE B-20 were added to the mixture and mixing was continued for about 5 more minutes. Finally, HIDACID FTM Blue 9 dye was added to the mixture and mixing was continued for about 30 additional minutes. The components were used in the amounts shown below.

| Component | Function | Amount |
|---|---|---|
| Deionized Water | Solvent | 67.3 wt. % |
| Lithium Chloride | Anti-Smear Agent | 8 wt. % |
| Pure Cane Powdered Sugar (Sucrose) | Lightfastness imparting agent | 15 wt. % |
| Propylene Glycol | Co-Solvent | 9 wt. % |
| ACTICIDE B-20 | Biocide | 0.2 wt. % |
| HIDACID FTM Blue 9 | Dye | 1.5 wt. % |

Example 20

Smear Resistance Testing

Referring to FIGS. 1A-1C, a comparison of the smear resulting from highlighting a previously applied ink marking using the ink formulation of Example 7 (labeled A29 in the Figures) was compared to the smear resulting from highlighting with commercially available yellow highlighter inks. Specifically, the ink formulation of Example 7 was compared to inks contained in Avery HI-LITER®marker, Stabilo Boss® Executive marker, and Stabilo Boss® Inkjet generation marker. A comparison was also made to the commercially available highlighting ink formulation HL5030, the formulation of which is shown below.

HL5030 Formulation:

| Component | Function |
|---|---|
| Deionized Water | 56.32 wt. % |
| Glycerin | 10.00 wt. % |
| DOWICIL 150 (biocide) | 0.20 wt. % |
| ACTICIDE B-20 (biocide) | 0.20 wt. % |
| Sodium Acetate | 0.90 wt. % |
| Triethanol Amine 9 | 20.00 wt. % |
| JONCRYL HPD 71 (resin solution) | 10.00 wt. % |
| Pyranine conc. 1020 | 2.38 wt. % |

The extent of smearing of ink markings on standard paper was measured by first producing a smear trace over the ink marking. Referring to FIG. 1A, the ink marking can be in the form of a straight line, while the smear trace can be in the form of a wavy or zigzag line. The smear trace can be trimmed so that at least one edge of the trace is parallel to the ink marking. The ink marking and the smear trace can be formed, for example, using a write test machine, such as an Anja W10B Write Test Machine. Preferably, the write test machine has the ability to draw a straight line for at least 100 cm, the ability to drawn a wavy/zigzag line for at least 100 cm, a five minute pause between the ink marking line and the smear trace line, and the ability to control point load.

The smear image is then digitized, using for example, a flatbed digital scanner, for example an Epson Perfection V700 Photo, and Epson PerfectionV750 Photo, or similar scanner. If needed, the scanner bulb can be first warmed-up by allowing it to scan the blank background for at least two minutes, and preferably five minutes. The smear image is then scanned into a computer for further processing and analysis.

Referring to FIG. 1B, the ink smear can be electronically isolated from the digitized image, using, for example, a computer program such as Photoshop CS3 and smear extraction software. Further processing of the extracted smears can be performed prior to smear analysis. For example, the extracted smear image can be converted to a black and white image using a threshold value, for example, of 241. The white pixels of the converted image represent the pixels of the image whose value is in the threshold range, while the black pixels represent the pixels of the image outside of the threshold range. Additionally, small portions of the smears that have a direction against the direction of travel when the writing instrument or machine generates the smear can be eliminated. This can be done, for example, by aligning the extracted smear image under the smear trace and eliminating the portion of the extracted smear image going against the direction of travel of the highlighter, using, for example, an eraser tool of the computer program, such as the eraser tool of Photoshop CS3.

Referring to FIG. 1C, the ink smear can then be analyzed to determine, for example, the area of the smear. The analysis can be done, for example, using a computer program designed to analyze and measure the smear. For example, the image analysis software PAX-it™ (MIS, IL), can be used to analyze the smear.

The following table provides the numerical value of the smear areas illustrated in FIGS. 1A-1C. As illustrated by the table and FIGS. 1A-1C, the ink formulation of Example 7 had significantly lower smear area as compared to the commercially available ink formulations. The average smear area of the commercially available ink formulations was 2.6 mm$^2$.

TABLE 1

| Ink Formulation | Average Smear Area (mm2) | Average Standard Deviation |
|---|---|---|
| Example 7 (A29) | 0.296 | 0.047 |
| Avery Hi-Liter | 4.351 | 0.46 |
| HL5030 | 2.218 | 0.615 |
| Stabilo Boss Executive | 2.01 | 0.266 |
| Stabilo Boss Inkjet Generation | 1.824 | 0.246 |

Example 21

Cap Off Time

The effect of the amount of the anti-smear agent lithium chloride on the cap off time of the ink formulation was tested by varying the amount of lithium chloride and measuring the cap off time. Cap off time was measured by first conditioning the writing instruments containing the ink formulations to be tested and the substrates in the room in which the cap off testing was conducted. For example, the writing instruments having the caps on and the substrates can be placed in the room for a period of time of about four hours. The writing instruments should be fresh, unused writing instruments. Next an initial marking in a sinusoidal pattern is written on the substrate using each of the writing instruments containing the ink formulations to be tested to ensure that the writing instrument is writing properly, and each writing instrument is then recapped. The writing instruments are then all uncapped and a timer is started. Testing for cap-off can be conducted using any suitable time interval. At each time interval a marking in a sinusoidal pattern is written on the substrate using each of the writing instruments. The markings are then compared to the initial marking and analyzed to determine whether a continuous, unbroken line is produced. If such a line is produced, the writing instrument is tested at the next time interval by again marking a sinusoidal pattern on the substrate, comparing the marking to the initial marking, and analyzing the marking to determine whether a continuous, unbroken line is produced. Once the line produced by the writing instrument becomes discontinuous or broken as compared to the initial marking, the test can be stopped. The cap-off time of the writing instrument is the last tested time interval that the writing instrument was capable of producing an unbroken, continuous line.

Ten yellow ink formulations were tested using the above-described cap-off testing method—Formulations 21A through 21J. It can be ascertained from the data provided in the table below that by increasing the amount of lithium chloride content to greater than 10 wt. %, for example to about 15 wt. %, dramatic increases in cap off time can be achieved. Glycerin is typically expected to increase cap off time. The data, however, demonstrates that the increase in cap off time achieved with the formulations having greater than 15 wt. % lithium chloride is not attributable to the amount of glycerin included in the formulation.

TABLE 2

| | 21A | 21B | 21C | 21D | 21E |
|---|---|---|---|---|---|
| D.I. H2O | 70 | 63.3 | 63.3 | 70 | 70 |
| Lithium Chloride (LiCl) | 7 | 15 | 15 | 15 | 7 |
| Sodium Acetate (NaAc) | 1 | 3 | 1 | 3 | 3 |
| Pure Cane Powder Sugar | 5 | 10 | 5 | 5 | 10 |
| Glycerin | 11.3 | 3 | 12.5 | 1.8 | 6.8 |
| ACTICIDE B-20 | 0.2 | 0.2 | 0.2 | 0.2 | 0.2 |
| Triethanol Amine 9 | 4 | 4 | 2 | 4 | 2 |
| Pyranine conc. 1020 | 1.5 | 1.5 | 1 | 1 | 1 |
| Total | 100 | 100 | 100 | 100 | 100 |
| Viscosity, Brookfield @200 rpm, 25° C., poise | 2.8 | 4.6 | 4 | 3.4 | 2.95 |
| pH | 9.05 | 8.97 | 8.82 | 9.21 | 9.04 |
| Surface Tension | 61 | 65.3 | 64.8 | 65.2 | 63.1 |
| Specific Gravity | 1.11 | 1.178 | 1.155 | 1.144 | 1.125 |
| Total solids (%) | 14.5 | 29.5 | 22 | 24 | 21 |
| Cap Off Time (hrs) | 3 | 94 | 96 | 198 | 3 |

| | 21F | 21G | 21H | 21I | 21J |
|---|---|---|---|---|---|
| D.I. H2O | 70 | 63.3 | 63.3 | 63.58 | 56.3 |
| Lithium Chloride (LiCl) | 15 | 7 | 7 | 8.3 | 10 |
| Sodium Acetate (NaAc) | 1 | 1 | 3 | 4.2 | 5 |
| Pure Cane Powder Sugar | 10 | 10 | 5 | 12.5 | 15 |
| Glycerin | 0.3 | 13.5 | 18 | 8.3 | 10 |

TABLE 2-continued

| | | | | | |
|---|---|---|---|---|---|
| ACTICIDE B-20 | 0.2 | 0.2 | 0.2 | 0.17 | 0.2 |
| Triethanol Amine 9 | 2 | 4 | 2 | 1.7 | 2 |
| Pyranine conc. 1020 | 1.5 | 1 | 1.5 | 1.25 | 1.5 |
| Total | 100 | 100 | 100 | 100 | 100 |
| Viscosity, Brookfield @200 rpm, 25° C., poise | 3.22 | 3.87 | 3.75 | 4.6 | 6.3 |
| pH | 8.75 | 9.37 | 8.92 | 8.65 | 8.85 |
| Surface Tension | 67 | 63.7 | 62.1 | 64.5 | 63.2 |
| Specific Gravity | 1.149 | 1.136 | 1.133 | 1.17 | 1.2 |
| Total solids (%) | 27.5 | 19 | 16.5 | 26.25 | 31.5 |
| Cap Off Time (hrs) | 290 | 3 | 3 | 3 | 3 |

Although the foregoing text is a detailed description of numerous different embodiments of an ink formulation in accordance with the disclosure, the detailed description is to be construed as exemplary only and does not describe every possible embodiment of in accordance with the disclosure. Consequently only such limitations as appear in the appended claims should be placed on the invention.

What is claimed:

1. A highlighting ink formulation, comprising:
   a solvent system;
   a dye dissolved in the solvent system; and
   an anti-smear agent dispersed or dissolved in the solvent system, the anti-smear agent comprising a lithium cation, wherein the lithium cation is included in the anti-smear agent in the form of a salt comprising an anion selected from the group consisting of chloride, nitride, sulfate, acetate, citrate, propionate, borate, nitrate, and combinations thereof.

2. The ink formulation of claim 1, wherein the solvent system comprises water.

3. The ink formulation of claim 1, wherein the solvent system comprises a co-solvent selected from the group consisting of propylene glycol, glycerin, and combinations thereof.

4. The ink formulation of claim 1, further comprising an additive selected from the group consisting of a pH adjuster, a biocide, a humectant, a lightfastness imparting agent, and combinations thereof.

5. The ink formulation of claim 1, wherein the salt is selected from the group consisting of lithium chloride, lithium acetate, lithium borate, lithium nitrate, and combinations thereof.

6. The ink formulation of claim 1, wherein the anti-smear agent is included in the ink formulation in an amount in a range of about 1 wt. % to about 30 wt. %.

7. The ink formulation of claim 6, wherein the anti-smear agent is included in the ink formulation in an amount in a range of about 12 wt. % to about 30 wt. %.

8. The ink formulation of claim 1, further comprising a second anti-smear agent comprising a sodium cation and/or a potassium cation.

9. The ink formulation of claim 8, wherein the sodium cation and/or the potassium cation is included in the anti-smear agent in the form of a salt.

10. The ink formulation of claim 9, wherein the salt is selected from the group consisting of sodium chloride, sodium acetate, sodium carbonate, sodium borate, sodium nitrate, sodium phosphate, potassium chloride, potassium acetate, potassium carbonate, potassium borate, potassium nitrate, potassium phosphate, and combinations thereof.

11. The ink formulation of claim 1, wherein the dye is included in the ink formulation in a range of about 0.1 wt. % to about 5 wt. %.

12. The ink formulation of claim 1, further comprising a pigment dispersion.

13. A writing instrument comprising the ink formulation of claim 1.

14. The writing instrument of claim 13, wherein the writing instrument is a marker comprising an ink reservoir containing the ink formulation, said reservoir in fluid communication with a writing point.

15. A method of highlighting a previously applied marking comprising marking over the previously applied marking using the highlighting ink formulation of claim 1, wherein the previously applied marking remains substantially unsmeared by the marking formed of the highlighting ink formulation.

16. A method of highlighting a previously applied marking comprising marking over the previously applied marking using the highlighting ink formulation of claim 1, wherein the highlighting ink formulation marking creates a smear having an area of less than about 1 mm$^2$.

* * * * *